United States Patent
Reilly et al.

(10) Patent No.: US 12,482,999 B2
(45) Date of Patent: Nov. 25, 2025

(54) 780 NM ULTRASHORT-PULSED FIBER LASER

(71) Applicant: Coherent Scotland Limited, Glasgow (GB)

(72) Inventors: Sean Reilly, Bearsden (GB); Lee Cairns, Bearsden (GB); Volker Leonhardt, Anniesland (GB)

(73) Assignee: Coherent Scotland Limited, Glasgow (GB)

( * ) Notice: Subject to any disclaimer, the term of this patent is extended or adjusted under 35 U.S.C. 154(b) by 857 days.

(21) Appl. No.: 17/473,773

(22) Filed: Sep. 13, 2021

(65) Prior Publication Data

US 2022/0085566 A1 Mar. 17, 2022

(30) Foreign Application Priority Data

Sep. 14, 2020 (GB) .................................. 2014405.1

(51) Int. Cl.
*H01S 3/067* (2006.01)
*H01S 3/094* (2006.01)
(Continued)

(52) U.S. Cl.
CPC .......... *H01S 3/06708* (2013.01); *H01S 3/067* (2013.01); *H01S 3/094003* (2013.01);
(Continued)

(58) Field of Classification Search
CPC .............................. H01S 3/0092; H01S 3/1608
See application file for complete search history.

(56) References Cited

U.S. PATENT DOCUMENTS

| | | |
|---|---|---|
| 5,260,823 A | 11/1993 | Payne et al. |
| 5,400,350 A | 3/1995 | Galvanauskas |

(Continued)

FOREIGN PATENT DOCUMENTS

| | | | |
|---|---|---|---|
| EP | 2194621 A | 6/2010 | |
| WO | WO-2005081430 A2 * | 9/2005 | ........... H01S 3/0057 |
| WO | WO-2007127356 A2 | 11/2007 | |

OTHER PUBLICATIONS

Paschotta R., Understanding fiber amplifiers and lasers, Laser-journal LTJ, No. 5, Sep. 2011, 45-47p. (Year: 2011).*

(Continued)

*Primary Examiner* — Minsun O Harvey
*Assistant Examiner* — Fernanda Adriana Camacho Alanis
(74) *Attorney, Agent, or Firm* — Morrison & Foerster LLP

(57) ABSTRACT

An erbium fiber laser produces a beam of ultrashort laser pulses having a center wavelength greater than 780 nanometers, an average power greater than 0.5 watt, and a spectral bandwidth compressible to a pulse duration of less than 200 femtoseconds. The laser includes a fiber preamplifier that is energized by a counter-propagating pump beam, has relatively low population inversion in a relatively long optical gain fiber, and provides a spectrally-shaped beam for further amplification. Wavelength dependent gain and absorption within the optical gain fiber enhances longer wavelengths relative to shorter wavelengths in the spectrally-shaped beam. The spectral shaping is sufficient to overcome gain narrowing and gain shifting in a subsequent high-gain fiber amplifier.

25 Claims, 9 Drawing Sheets

(51) Int. Cl.
*H01S 3/16* (2006.01)
*H01S 3/00* (2006.01)

(52) U.S. Cl.
CPC .......... *H01S 3/1608* (2013.01); *H01S 3/0092* (2013.01); *H01S 3/094076* (2013.01)

(56) References Cited

U.S. PATENT DOCUMENTS

| | | | |
|---|---|---|---|
| 5,416,865 A | | 5/1995 | Fielding |
| 5,731,892 A | * | 3/1998 | DiGiovanni ........ H01S 3/06758 359/337.3 |
| 5,933,437 A | * | 8/1999 | Delavaux .......... H01S 3/094003 372/6 |
| 6,198,568 B1 | * | 3/2001 | Galvanauskas ....... H01S 3/0057 359/332 |
| 6,882,466 B1 | * | 4/2005 | Shimojoh ........... H01S 3/06758 359/341.33 |
| 8,774,236 B2 | | 7/2014 | Ter-Mikirtychev |
| 2011/0306954 A1 | | 12/2011 | Morin et al. |
| 2016/0028204 A1 | | 1/2016 | Tu et al. |
| 2019/0245317 A1 | * | 8/2019 | Wada ...................... H01S 3/10 |
| 2022/0393421 A1 | * | 12/2022 | Wong ...................... G01J 3/10 |

OTHER PUBLICATIONS

Paschotta R., Erbium-doped Fiber Amplifiers, Jul. 23, 2019: https://web.archive.org/web/20190723124322/https:// www.rp-photonics.com/erbium_doped_fiber_amplifiers.html (Year: 2019).*

Elahi et al., (2017). "175 fs-long pulses from a high-power single-mode Er-doped fiber laser at 1550 nm," Optics Communications, 403:381-384.

Hofer et al., (1998). "High-power 100-fs pulse generation by frequency doubling of an erbium-ytterbium-fiber master oscillator power amplifier," Optics Letters, 23(23):1840-1842.

International Search Report and Written Opinion received for International Patent Application No. PCT/GB2021/052150 mailed on Dec. 6, 2021, 17 pages.

Kotov et al., (2014). "Double-clad large mode area Er-doped fiber for high-energy and high-peak power amplifiers," Proceedings of SPIE, 8961:89611L1-8.

Lim et al., (2012). "High-energy, in-band pumped erbium doped fiber amplifiers," Optics Express, 20(17): 18803-18818.

Lim et al., (2012). "Optimizing the pumping configuration for the power scaling of in-band pumped erbium doped fiber amplifiers," Optics Express, 20(13):13886-13895.

Liu et al., (2015). "High Power 780 nm Femtosecond Fiber Laser," CLEO: 2015, OSA Technical Digest, paper AM1J.6, 2 pages.

Paschotta (2008). RP Photonics Encyclopedia "Erbium-Doped Gain Media," retrieved from <rp-photonics.com/erbium_doped_gain_media> Jun. 24, 2020, 8 pages.

Search Report received for United Kingdom Patent Application No. 2014405.1, search date Jan. 28, 2021, 2 pages.

Le Blanc, et al., (1996). "Gain-narrowing and gain-shifting of ultra-short pulses in Ti:sapphire amplifiers," Optics Communications, 131(4-6):391-398.

* cited by examiner

780 NM ULTRASHORT-PULSED FIBER LASER

CROSS REFERENCE TO RELATED APPLICATIONS

This application claims priority to United Kingdom Patent Application No. 2014405.1, filed on Sep. 14, 2020, the entire disclosure of which is incorporated herein by reference.

TECHNICAL FIELD OF THE INVENTION

The present invention relates in general to generating ultrashort pulses of laser radiation. The invention relates in particular to generating laser radiation having pulse durations of less than 200 femtoseconds and wavelengths of about 780 nanometers.

DISCUSSION OF BACKGROUND ART

Lasers producing beams of ultrashort laser pulses at near-infrared wavelengths are the enabling technology for analytical techniques that use multi-photon excitation. Notably, two-photon and three-photon microscopy for in situ imaging of biological tissue. A fluorescent dye is added to a tissue sample. Two photons or three photons are simultaneously absorbed from a near-infrared laser beam to excite a dye molecule, which then fluoresces at a shorter wavelength. The laser beam is focused and the focus is scanned in three-dimensions through the tissue sample. The fluorescence is detected and measured to create a three-dimensional image of the sample. The high intensities required for multi-photon absorption confine the excitation to a relatively small volume in the tissue for high-resolution imaging. Excitation using near-infrared wavelengths provides the advantages of weak single-photon absorption for deep penetration into the tissue sample and weak scattering for low background noise.

Ultrashort-pulsed lasers that use titanium-doped sapphire crystals as the gain medium are the most common excitation source for multi-photon imaging. These lasers are often tunable in wavelength and are commercially available. For example, the mode-locked Chameleon™ Ultra laser, available from Coherent Inc. of Santa Clara, California Ultrashort-pulsed fiber lasers, wherein the gain medium is an optical fiber having a glass core doped with rare-earth ions, are an emerging alternative excitation source for multi-photon imaging. For example, glass doped with neodymium ($Nd^{3+}$), ytterbium ($Yb^{3+}$), or erbium ($Er^{3+}$) ions. Fiber lasers can be made more compact and are potentially less expensive than titanium sapphire lasers.

Erbium ions in fused silica glass can provide laser radiation over a broad range of wavelengths, with a gain peak around 1535 nanometers (nm), but extending from below 1480 nm to above 1600 nm. This broad gain spectrum can support mode-locked lasing and ultrashort pulses having pulse durations of hundreds of femtoseconds. The ultrashort pulses can be efficiently frequency doubled in a nonlinear crystal. For example, laser radiation at the highest-gain wavelengths between 1520 nm and 1570 nm can be frequency doubled to wavelengths between 760 nm and 785 nm in beta barium borate ($BaB_2O_4$) or lithium niobate ($LiNbO_3$) crystals. This wavelength range provides access to Sapphire and CFP, which are two fluorescent proteins commonly used for two-photon excitation.

For analytical techniques that require high pulse energies above 1 millijoule (mJ), such as time-resolved spectroscopy and multi-dimensional spectroscopy, titanium sapphire is still the only practical gain medium. A problem when scaling the power of titanium sapphire amplifiers is described in "Gain-narrowing and gain-shifting of ultra-short pulses in Ti:sapphire amplifiers" by Le Blanc et al. in *Optics Communications*, volume 131, 1996, pages 391-398. Gain narrowing and gain shifting occur when broad-bandwidth laser radiation is amplified in multi-pass and regenerative amplifier arrangements. Gain narrowing occurs because laser radiation at wavelengths closest to the gain peak at 800 nm are preferentially amplified. Gain shifting occurs because the gain spectrum is asymmetrical about the gain peak, having higher gain cross-sections at longer wavelengths. Spectrally-selective losses can be incorporated into the amplifier to reshape the effective gain spectrum, but such losses reduce efficiency and increase complexity.

SUMMARY OF THE INVENTION

FIG. 2 in Le Blanc illustrates that for an input bandwidth of 50 nm (FWHM $Sech^2$), maximum gain narrowing in titanium sapphire occurs for an input center wavelength between 800 nm and 860 nm, while gain shifting reduces as the input center wavelength increases. There is a compromise between gain narrowing and spectra shifting for an input beam having a center wavelength of about 780 nm. A fiber laser providing broad-bandwidth laser radiation that has about equal spectral content above and below 780 nm would be a relatively simple and cost-effective seed source for a titanium sapphire amplifier in a high-energy laser system producing femtosecond pulses.

In ultrashort-pulsed erbium fiber lasers, gain narrowing favors amplification at shorter wavelengths within the gain band between 1520 nm and 1570 nm, due to the strong gain peak in erbium-doped glass at about 1535 nm. Even so, after frequency doubling, the proteins Sapphire and CFP are still accessible for two-photon excitation. Another common fluorescent protein mCerulean has weak two-photon absorption cross-section below 780 nm, but the cross-section increases rapidly with wavelength above 780 nm. An ultrashort pulsed excitation source that provides significant spectral content above 780 nm could excite all three of these proteins, without the additional complexity and cost for wavelength tunability.

There is need for ultrashort-pulsed fiber lasers that generate spectrally-broad output laser radiation having a center wavelength of at least 780 nm. Preferably, the laser radiation would have an average power of at least 0.5 watt (W), and more preferably greater than 1 W. Preferably, the laser radiation would have sufficient bandwidth to support a pulse duration less than 200 femtoseconds (fs), and more preferably less than 150 fs.

In one aspect, a fiber laser in accordance with the present invention comprises a seed laser generating a pulsed fundamental beam having a center wavelength, and an optical gain fiber arranged to receive the fundamental beam. The fundamental beam propagates through the optical gain fiber from a first end to a second end thereof. The optical gain fiber has a core doped with erbium ions that are energized by a pump beam. The fundamental beam and the pump beam counter-propagate within the optical gain fiber. The pump beam has a power selected to produce population inversion at the second end of the optical gain fiber in a range between 30% and 60%. The optical gain fiber has a length selected to absorb all the power of the pump beam. The center wavelength of the fundamental beam increases between the first end and the second end of the optical gain fiber. A power amplifier is arranged to receive the fundamental beam from the optical gain fiber and to generate an amplified fundamental beam. The amplified fundamental beam has a spectral bandwidth that is compressible to a pulse duration less than or equal to 240 femtoseconds. A harmonic generator is arranged to receive the amplified fundamental beam and to generate a second-harmonic beam having a center wavelength greater than or equal to 780 nanometers.

In another aspect, a method for generating an output laser beam in accordance with the present invention comprises generating a pulsed fundamental beam having a center wavelength, and delivering the fundamental beam to an optical gain fiber having a core doped with erbium ions. The fundamental beam propagates through the optical gain fiber from a first end to a second end thereof. The erbium ions are energized using a pump beam. The fundamental beam and the pump beam counter-propagate within the optical gain fiber. The pump beam has a power selected to produce population inversion at the second end of the optical gain fiber in a range between 30% and 60%. The optical gain fiber has a length selected to absorb all the power of the pump beam. The center wavelength of the fundamental beam increases between the first end and the second end of the optical gain fiber. The fundamental beam from the optical gain fiber is amplified to generate an amplified fundamental beam. The amplified fundamental beam has a spectral bandwidth that is compressible to a pulse duration less than or equal to 240 femtoseconds. The amplified fundamental beam is converted to an output laser beam by second-harmonic generation. The output laser beam has a center wavelength greater than or equal to 780 nanometers.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
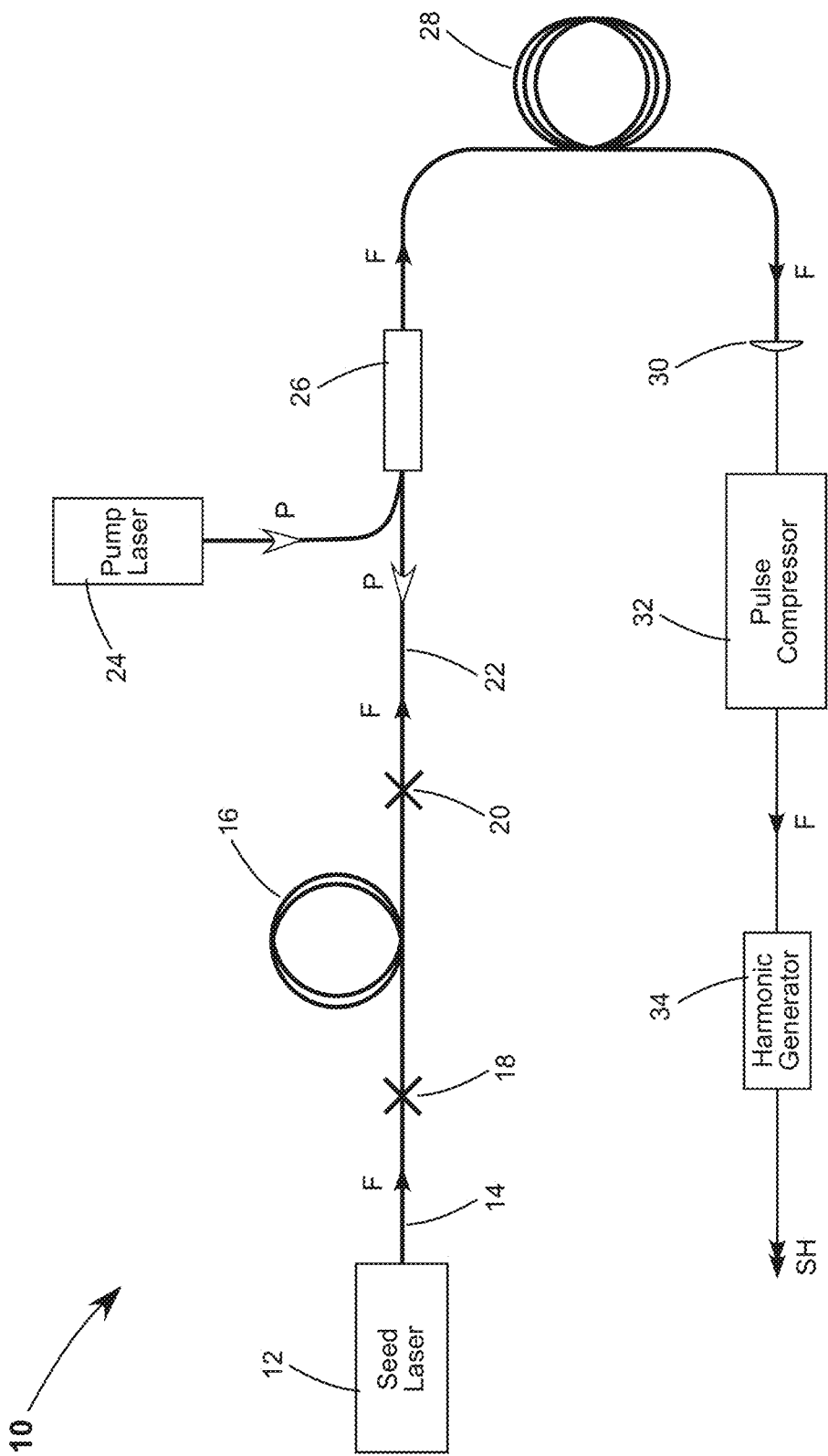
FIG. 1 is a block diagram schematically illustrating one preferred embodiment of an erbium fiber laser in accordance with the present invention for generating a beam of pulsed laser radiation, including a seed laser generating a fundamental beam, a pump laser generating a pump beam, a low-population-inversion optical gain fiber, a high-gain power amplifier generating an amplified fundamental beam, a pulse compressor, and a harmonic generator generating a second-harmonic beam.

Referring now to the drawings, wherein like components are designated by like numerals, FIG. 1 schematically illustrates one preferred embodiment of a fiber laser 10 in accordance with the present invention. Fiber laser 10 includes a seed laser 12 for generating a fundamental beam of pulsed laser radiation, which is indicated in the drawing by single-headed arrows F. The fundamental beam is delivered through an optical fiber 14 to an optical gain fiber 16 and propagates from a first end 18 thereof to a second end 20 thereof while being preamplified. The preamplified fundamental beam continues propagating into another optical fiber 22. First end 18 is located at a splice between optical fiber 14 and optical gain fiber 16. Second end 20 is located at another splice between optical gain fiber 16 and optical fiber 22.

Fiber laser 10 further includes a pump laser 24 generating a beam of pump radiation, which is indicated in the drawing by single-headed arrows P. The pump beam is delivered via a beam combiner 26 and optical fiber 22 to second end 20 of optical gain fiber 16. Here, beam combiner 26 is reflective for the pump beam and transmissive for the fundamental beam, but other arrangements are possible to direct the pump beam into second end 20 without interrupting the fundamental beam. The fundamental beam and the pump beam are counter-propagating within optical gain fiber 16.

Optical gain fiber 16 has a core doped with erbium ($Er^{3+}$) ions that are energized by the pump beam. The optical gain fiber may also be co-doped with sensitizing ions, such as ytterbium ($Yb^{3+}$), that efficiently absorb the pump beam and transfer the pump energy to the erbium ions. The pump beam has a wavelength that is strongly absorbed by the dopant ions. Pump laser 24 could be a diode laser or diode laser assembly. By way of example, diode lasers are commercially available at 920 nm and 976 nm, which can be used for pumping ytterbium co-doped gain fibers. The pump beam has a power selected to produce population inversion at second end 20 of optical gain fiber 16 that is preferably in a range between 30% and 60% and more preferably in a range between 40% and 60%.

The length of optical gain fiber 16 is selected to absorb essentially all of the pump power as the pump beam propagates from second end 20 towards first end 18. At least 90% of the pump power is absorbed while the pump beam propagates half of the length and at least 99% of the pump power is absorbed while propagating the full length. Herein, "absorb all of the pump power" means absorbing at least 99% of the pump power. More preferably, at least 95% of the pump power is absorbed while the pump beam propagates half the length of optical gain fiber 16 and at least 99.75% is absorbed while propagating the full length.

Optical fibers 14 and 22 are undoped fibers, which are optically passive and could simply be fiber pigtails of seed laser 12 and beam combiner 26, respectively. It is convenient and straight-forward to join separate fiber components together by splicing. For example, forming the splices at first end 18 and second end 20 of optical gain fiber 16 using a commercial automated fusion splicer. However, alternative arrangements that omit optical fibers 14 and 22 by coupling optical gain fiber 16 directly to seed laser 12 or by incorporating optical gain fiber 16 into beam combiner 26 would work as well. Seed laser 12, optical gain fiber 16, beam combiner 26, and their neighboring elements can be integrated into functionally equivalent assemblies, without departing from the scope of the present invention.

The preamplified fundamental beam F propagates through beam combiner 26 and into a power amplifier 28. Here, power amplifier 28 is an erbium fiber amplifier that is energized by another pump beam (not depicted) and that further amplifies the fundamental beam. Power amplifier 28 could include a plurality of individual erbium fiber amplifiers that are arranged in series to achieve a desired gain, average power, and pulse energy. As discussed herein below, optical gain fiber 16 energized by pump laser 24 is a fiber preamplifier that spectrally-shapes the fundamental beam, while power amplifier 28 is configured to amplify the spectrally-shaped fundamental beam.

The amplified fundamental beam transitions from fiber-guided to free-space propagation, is collimated by a fiber collimator 30, and is directed thereby into an optional pulse compressor 32. Pulses in the amplified and collimated fundamental beam are temporally compressed to a shorter duration by pulse compressor 32. The amplified and compressed fundamental beam F is directed into a harmonic generator 34, which generates a second-harmonic beam by second-harmonic generation in a quasi-phase-matched optically-nonlinear crystal. The second-harmonic beam is indicated in the drawing by double-headed arrows SH. Pulse compression and harmonic generation are well known in the art and further description thereof is not necessary for understanding the principles of the present invention.

Figure 2:
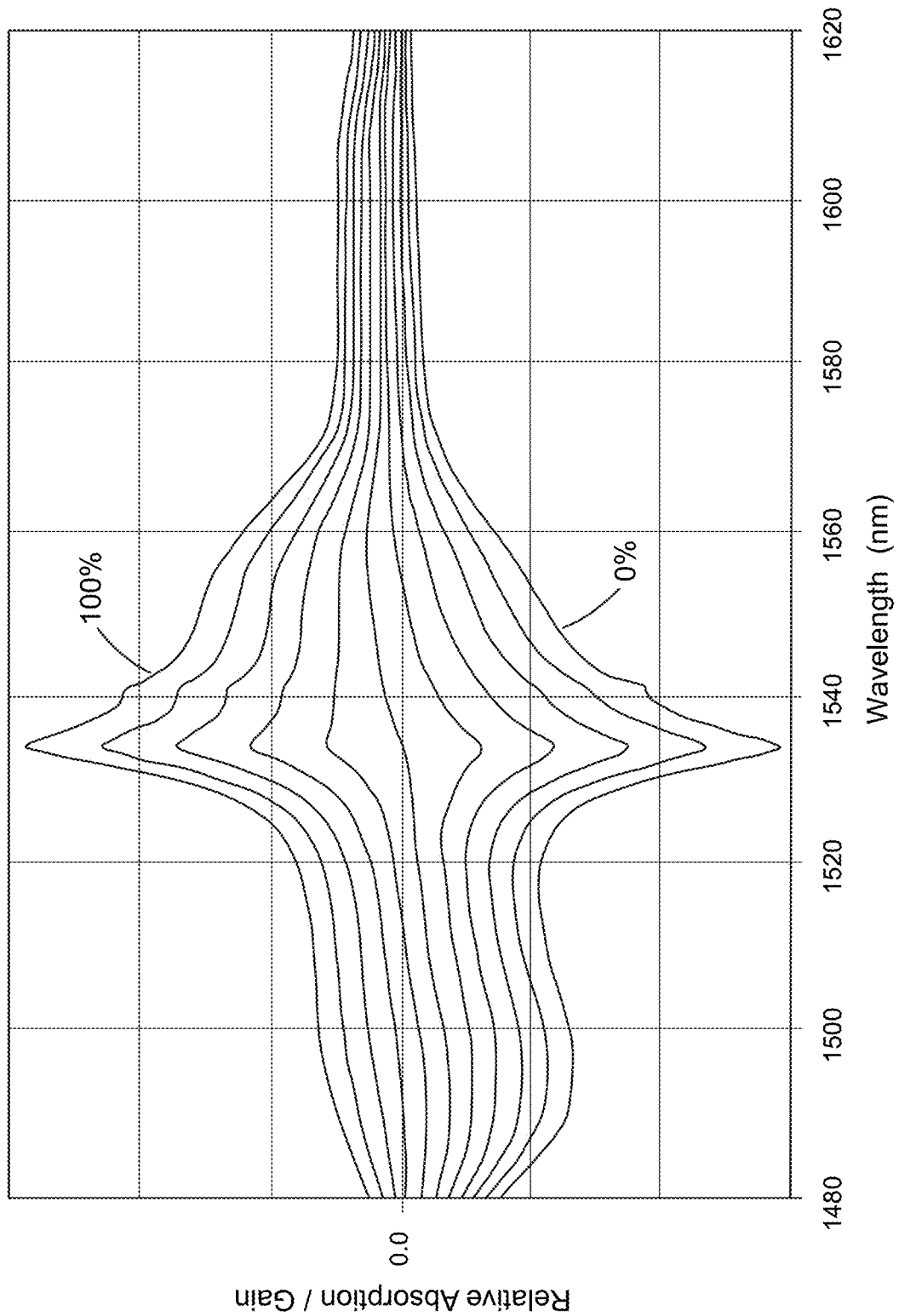
FIG. 2 is a graph schematically illustrating absorption or gain vs. wavelength for different population inversions in the core of the optical gain fiber of FIG. 1, which is made of an erbium-doped glass.

FIG. 2 is a graph schematically illustrating relative absorption and relative gain vs. wavelength of erbium-doped glass for different population inversions between 0% and 100%. Values less than zero on the vertical axis correspond to optical absorption and values greater than zero correspond to optical gain for a beam of radiation that is propagating in the glass. The graph was adapted from FIG. 3 of the online article "Erbium-Doped Gain Media" as it was presented on 24 Jun. 2020 in *RP Photonics Encyclopedia* (rp-photonics.com/erbium_doped_gain_media).

Population inversion refers generally to the number of energized ions divided by the total number of ions, expressed as a percentage. Here, specifically, population inversion is the number of erbium ions in the $^4I_{13/2}$ excited state divided by the total number of erbium ions in the $^4I_{15/2}$ ground state and the $^4I_{13/2}$ excited state. A beam of radiation at the 1540 nm wavelength of the $^4I_{15/2} \leftrightarrow {^4I_{13/2}}$ transition would be absorbed if the population inversion is less than 50% and amplified if the population inversion is greater than 50%. The $^4I_{13/2}$ and $^4I_{15/2}$ energy states of erbium ions in glass are split by the crystal field into multiplets having a plurality of individual Stark energy levels. Additional inhomogeneous broadening further broadens the $^4I_{15/2} \leftrightarrow {^4I_{13/2}}$ transition. For example, the $^4I_{13/2} \rightarrow {^4I_{15/2}}$ emission transition has a $1/e^2$ intensity linewidth of approximately 100 nm at room temperature. Relative absorption and gain therefore depend on wavelength, as depicted in the drawing.

Figure 3A:
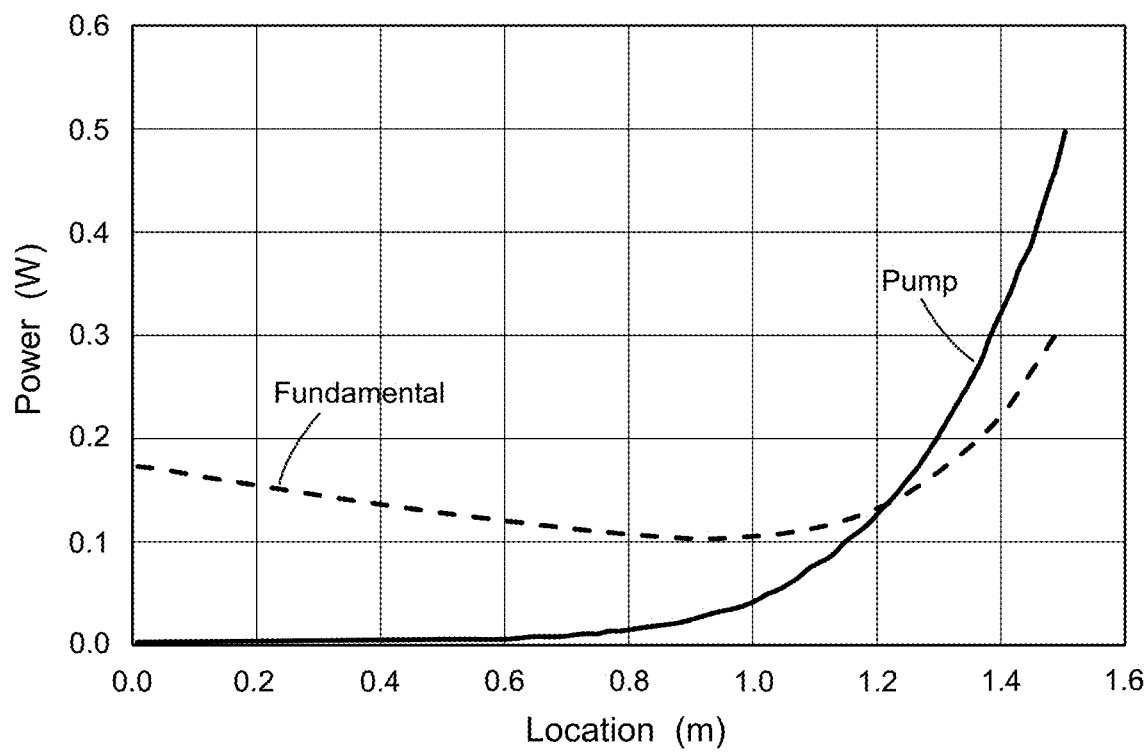
FIGS. 3A and 3B are graphs schematically illustrating calculated power in the fundamental beam, calculated power in the pump beam, and calculated population inversion vs. location along an example of the optical gain fiber of FIG. 1.

FIG. 3A is a graph schematically illustrating power in the fundamental beam and power in the pump beam vs. location along an example of optical gain fiber 16 of FIG. 1, in accordance with the present invention. These powers were calculated by modeling absorption and stimulated emission in an exemplary 1.5 m long optical gain fiber. First end 18 is located at 0 m and second end 20 is located at 1.5 m. The fundamental beam guided into the first end has a power of about 0.17 W and a broad spectrum extending from about 1547 nm to about 1583 nm. The pump beam guided into the second end has a power of about 0.50 W. The pump beam is depleted to a power of about 0.01 W after propagating along half the length of the optical gain fiber. Essentially all the power of the pump beam is absorbed after propagating along the whole length of the optical gain fiber. The fundamental beam is partially absorbed in the first 0.9 m of the optical gain fiber and the residual fundamental beam is amplified in the last 0.6 m of the gain fiber.

Figure 3B:
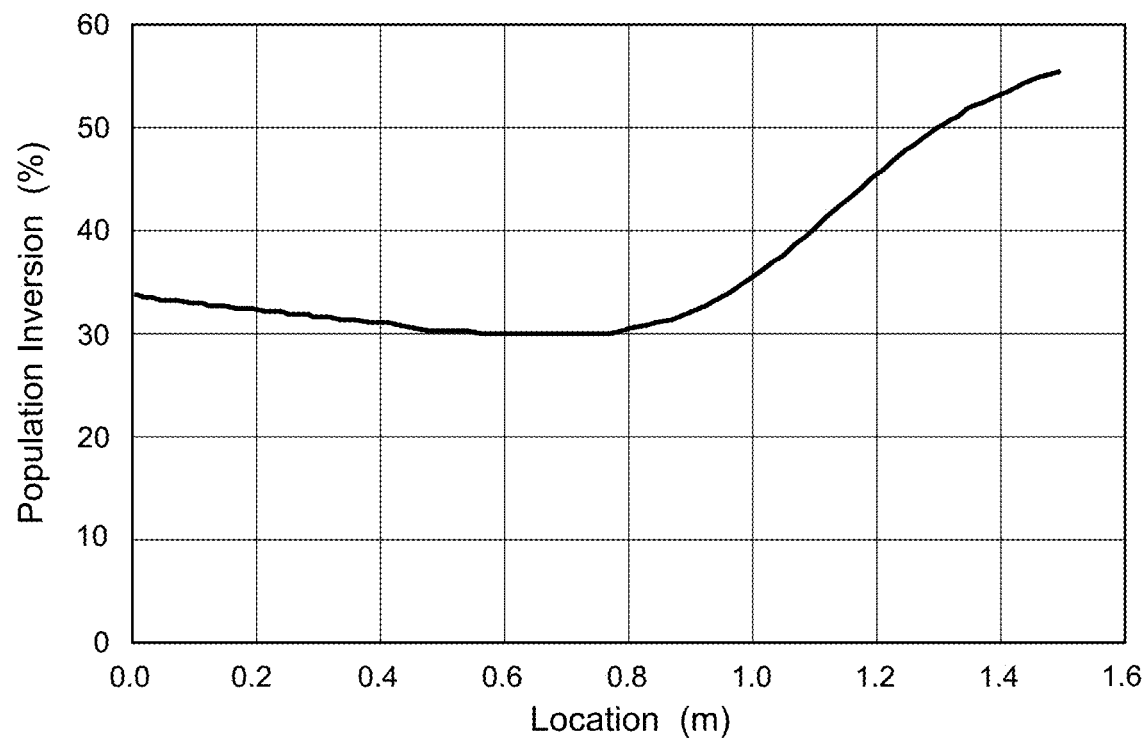

FIG. 3B is a graph schematically illustrating calculated population inversion vs. location in the same exemplary optical gain fiber as FIG. 3A. The graph illustrates that population inversion depends on the location within the optical gain fiber. Population inversion slightly increases towards the first end of the optical gain fiber due to a net absorption of the fundamental beam. Population inversion also increases towards the second end due to strong absorption of the pump beam. Minimum population inversion is located between 0.6 m and 0.7 m. The population inversion is about 34% at 0 m, about 30% at 0.65 m, and about 55% at 1.5 m. The population inversion in the optical gain fiber can be characterized as being low for a fiber preamplifier. The population inversion everywhere therein is less than 60% and the overall gain of the preamplifier is correspondingly low.

Figure 4:
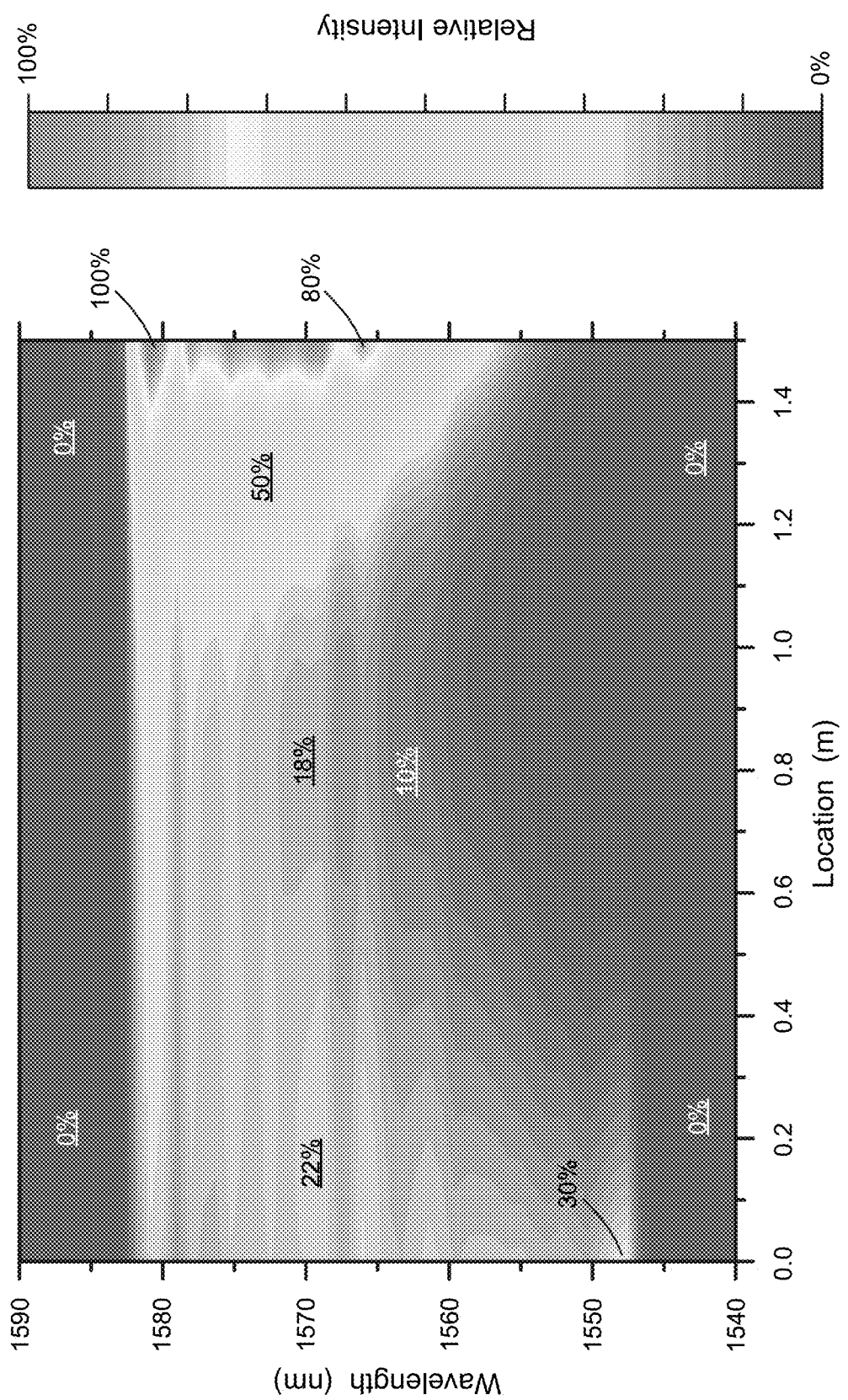
FIG. 4 is a two-dimensional graph schematically illustrating calculated intensity of the fundamental beam as a function of wavelength and location along the optical gain fiber of FIGS. 3A and 3B.

FIG. 4 is a two-dimensional graph schematically illustrating calculated relative intensity of the fundamental beam as a function of both wavelength and location in the exemplary optical gain fiber of FIG. 3A. FIG. 4 spectrally resolves the power of the fundamental beam depicted in FIG. 3A. The behavior illustrated in FIG. 4 can be interpreted with reference to the relative absorption or gain depicted in FIG. 2 and the aggregate population inversion depicted in FIG. 3B. Between the first end at 0 m and about 1.0 m, the population inversion is less than 35%, which means the optical gain fiber absorbs wavelengths less than about 1562 nm, while wavelengths greater than about 1570 nm experience a small gain. Approximately 40% of the power of the fundamental beam propagating through the first end is absorbed in the first meter of the optical gain fiber. Essentially, all the power remaining in the residual fundamental beam between about 0.9 m and 1.0 m is at wavelengths greater than 1562 nm.

From about 1.0 m to the second end at 1.5 m, there is an increase in population inversion from about 35% to about 55%. There are corresponding increases in relative gain and in gain bandwidth. Referring to FIG. 2, at a population inversion of 55%, wavelengths greater than about 1525 nm experience gain, with the strongest gain between about 1535 nm and 1565 nm. FIG. 4 demonstrates that "seeding" the last 0.5 m of optical gain fiber with the residual fundamental beam, having a spectrum extending from about 1562 nm to about 1583 nm, produces an amplified fundamental beam at the second end with a spectrum dominated by the preferred longer wavelengths.

Figure 5A:
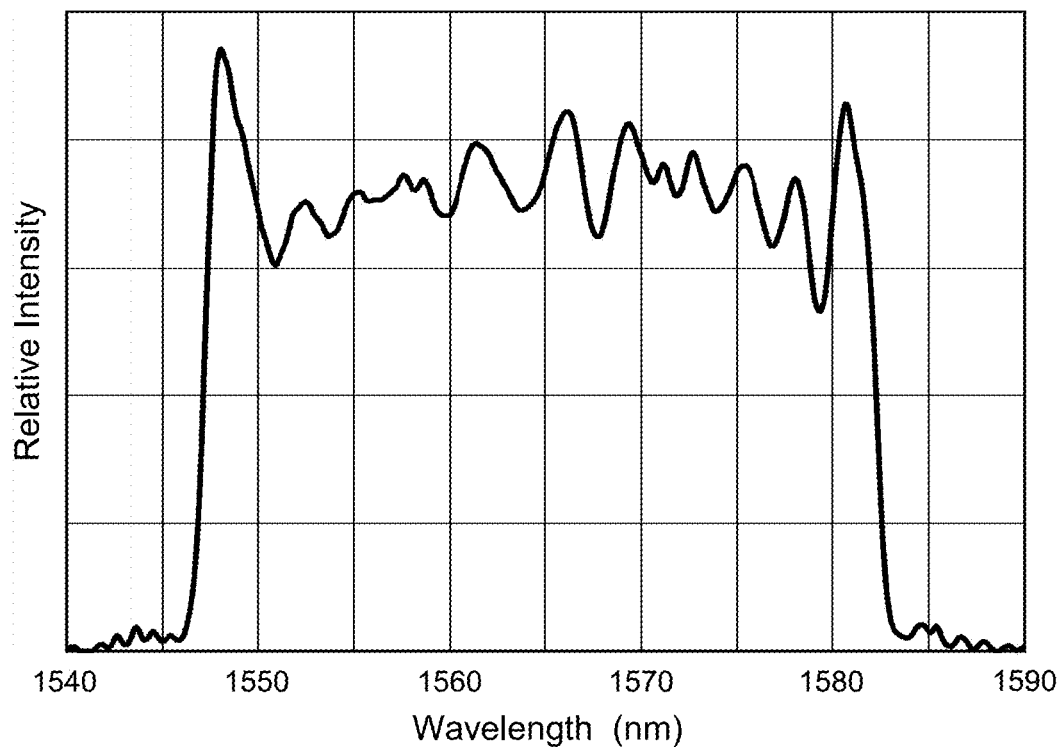
FIG. 5A is a graph schematically illustrating calculated intensity vs. wavelength for the fundamental beam generated by an example of the seed laser in FIG. 1.

FIG. 5A is a graph schematically illustrating calculated relative intensity vs. wavelength of the fundamental beam at first end 18 of the exemplary optical gain fiber, which was used in the modeling of FIGS. 3A, 3B, and 4. Seed laser 12 may be an erbium fiber oscillator and may include additional erbium fiber preamplifiers. This spectrum of the fundamental beam provided by an example of seed laser 12 has approximately uniform intensity between about 1547 nm and about 1583 nm. The undulating structure overlaying the spectrum is produced by self-phase modulation (SPM) and is characteristic of output from an ultrashort pulsed erbium fiber laser. Pulses in the fundamental beam provided by the seed laser would typically be stretched to durations of tens of picoseconds, to prevent undesirable nonlinear optical processes in power amplifier 28.

Figure 5B:
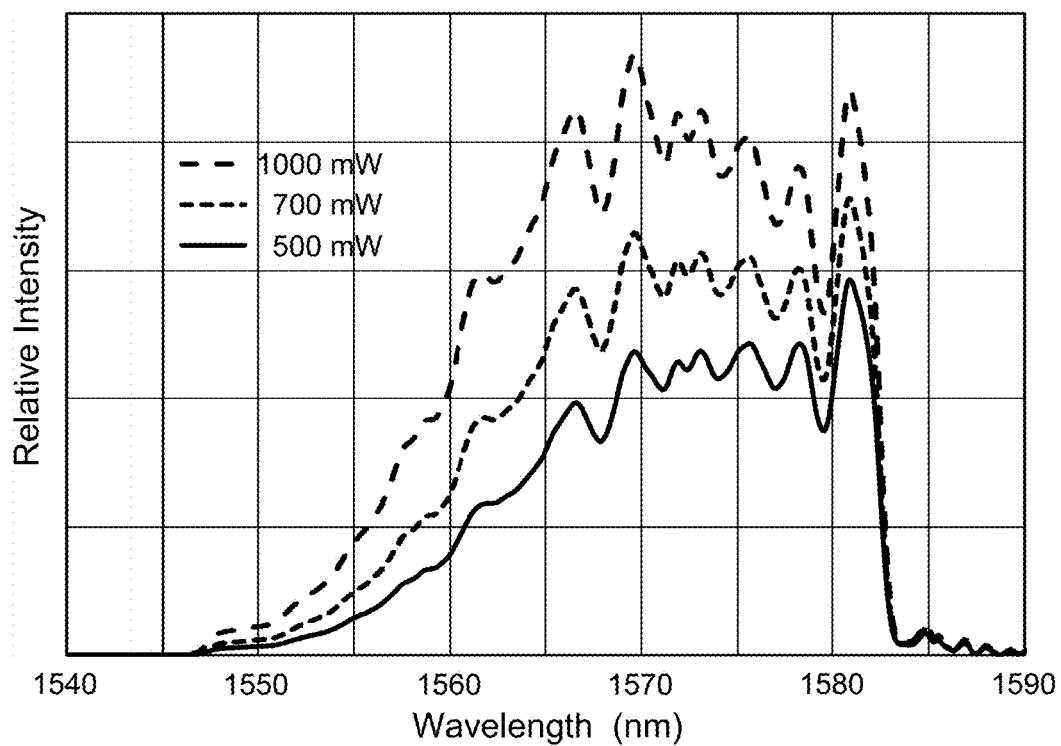
FIG. 5B is a graph schematically illustrating calculated intensity of the fundamental beam of FIG. 5A after propagating through the optical gain fiber of FIGS. 3A and 3B vs. wavelength, for different powers of the pump beam.

FIG. 5B is a graph schematically illustrating calculated relative intensity vs. wavelength of the preamplified fundamental beam at second end 20 of the exemplary optical gain fiber seeded by the exemplary fundamental beam depicted in FIG. 5A, for different powers of the pump beam between 500 milliwatts (mW) and 1000 mW. Overall, in this range of pump powers, the longer wavelengths within the seed fundamental beam are preferentially amplified and the shorter wavelengths are preferentially absorbed. The longer wavelengths are thereby enhanced and the shorter wavelengths are suppressed in the spectrum of the preamplified fundamental beam. In this example, the intensities of wavelengths greater than about 1570 nm are enhanced relative to the intensities of wavelengths less than about 1562 nm. The center wavelength of the fundamental beam increases from about 1565 nm at the first end to a wavelength between about 1570 nm and about 1575 nm at the second end. The precise center wavelength at the second end has some dependence on the pump power. Herein, "center wavelength" refers to the arithmetic centroid wavelength in a spectrum.

Figure 6:
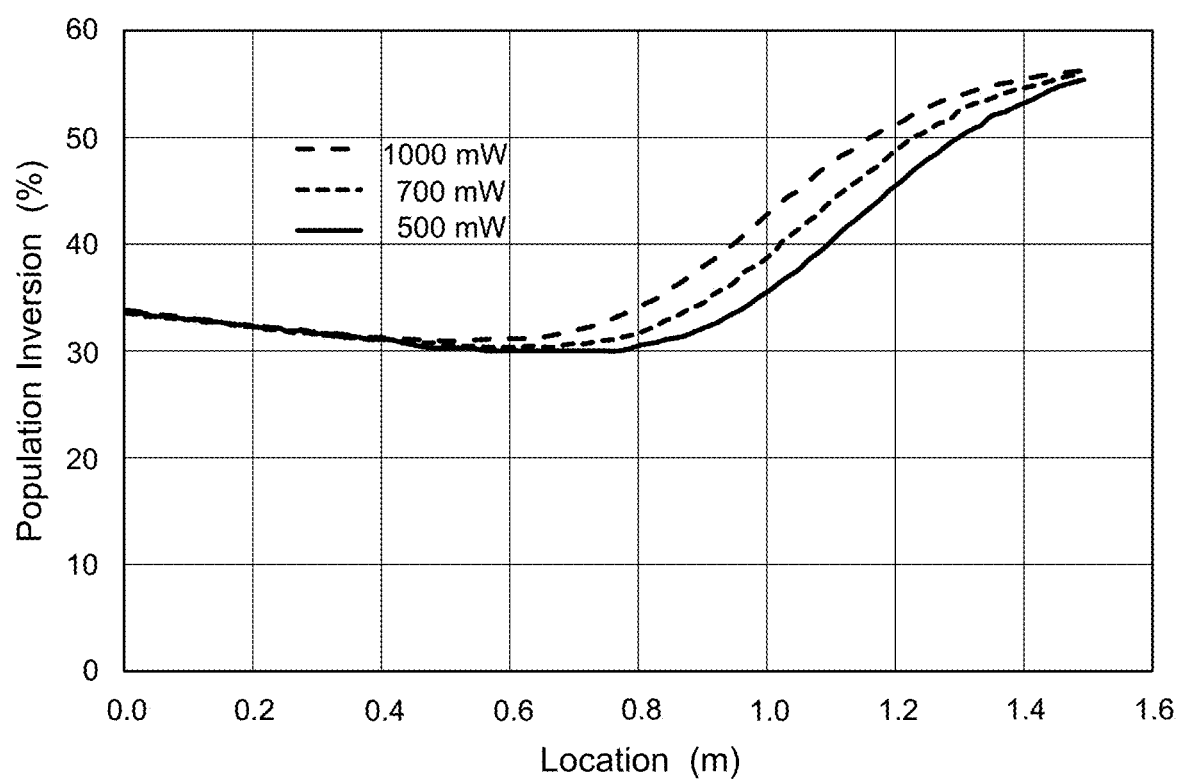
FIG. 6 is a graph schematically illustrating calculated population inversion vs. location along the optical gain fiber of FIGS. 3A and 3B, for different powers of the pump beam.

FIG. 6 is a graph schematically illustrating calculated population inversion vs. location in the exemplary optical gain fiber for the pump powers of FIG. 5B. FIG. 6 illustrates that an important consequence of changing the pump power is to change the aggregate population inversion. Although a factor of two increase in pump power changes the population inversion at second end 20 by less than 1%, in some locations along the gain fiber the population inversion changes by up 7%. FIG. 2 illustrates that these changes in population inversion have a dramatic impact on the optical behavior of optical gain fiber 16. Nevertheless, FIG. 5B illustrates that the desired enhancement of longer wavelengths relative to shorter wavelengths persists over a range of pump powers. Furthermore, the pump power can be selected to produce a preamplified fundamental beam having a desired spectral bandwidth or a desired center wavelength.

It should be noted that constraining the population inversion to such low levels contradicts conventional principles for designing a laser preamplifier or laser amplifier. Generally, high population inversion is preferred to achieve maximum overall gain and maximum amplification in each amplifier of a fiber laser. Operating each amplifier at high population inversion (close to 100%) and high gain (typically 15-20 decibels (dB)) reduces the number of amplifiers required to achieve a target power and thereby minimizes the complexity and cost of such a fiber laser. In contrast, the inventive fiber laser includes a preamplifier having low-inversion (less than 60%) and low gain (2-3 dB), to produce the desired fundamental beam having significant spectral content at higher wavelengths within the $^4I_{13/2} \rightarrow ^4I_{15/2}$ emission transition of erbium in glass.

Similarly, the inventive fiber laser has a much longer optical gain fiber than would be used in a conventional fiber preamplifier, having the same absorptivity of the pump beam and operating at comparable powers. The long optical gain fiber absorbs essentially all of the pump power. Therefore, a substantial portion of the optical gain fiber preferentially absorbs shorter wavelengths within the fundamental beam.

Figure 7:
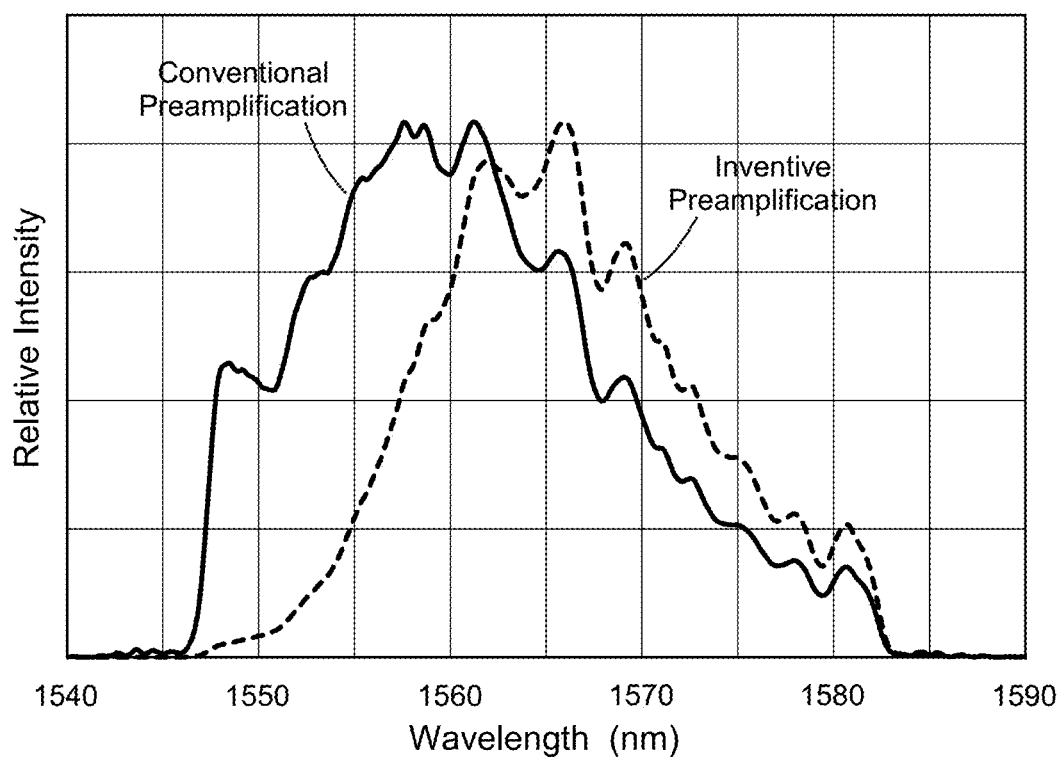
FIG. 7 is a graph schematically illustrating calculated intensity of the amplified fundamental beam following pre-amplification in the optical gain fiber of FIGS. 3A and 3B vs. wavelength, which is compared to an amplified fundamental beam following conventional preamplification.

FIG. 7 is a graph schematically illustrating calculated relative intensity vs. wavelength for fundamental beams after amplification in an example of power amplifier 28, having a 1 m long erbium and ytterbium co-doped gain fiber that provides about 20 dB of gain. The solid line is a calculated spectrum of an amplified fundamental beam when the power amplifier is seeded by a preamplified fundamental beam following conventional preamplification, which has a uniform spectrum similar to that depicted in FIG. 5A. The dashed line is a calculated spectrum of an amplified fundamental beam from power amplifier 28 in inventive fiber laser 10 of FIG. 1, which is seeded by the preamplified fundamental beam having significant spectral content at higher wavelengths, specifically the 500 mW spectrum of FIG. 5B.

The exemplary fiber power amplifier has peak gain between 1530 nm and 1540 nm, similar to the gain spectra for high population inversion depicted in FIG. 2, which causes significant gain shifting during amplification. For this reason, the amplified fundamental beam following conventional preamplification in FIG. 7 has a center wavelength that is less than 1560 nm. In contrast, the amplified fundamental beam of the inventive fiber laser has a center wavelength that is comfortably greater than 1560 nm, which is required to generate a second-harmonic beam having a center wavelength that is greater than 780 nm. The higher-wavelength spectral content in the preamplified fundamental beam generated by optical gain fiber 16 in the inventive fiber laser overcomes the gain shifting in power amplifier 28.

The power in the respective amplified fundamental beams is proportional to the area under each spectrum in FIG. 7. The amplified fundamental beams from the inventive fiber laser and the equivalent conventional fiber laser have comparable powers, but importantly, the inventive fiber laser provides more useful power at wavelengths greater than 1560 nm.

Figure 8A:
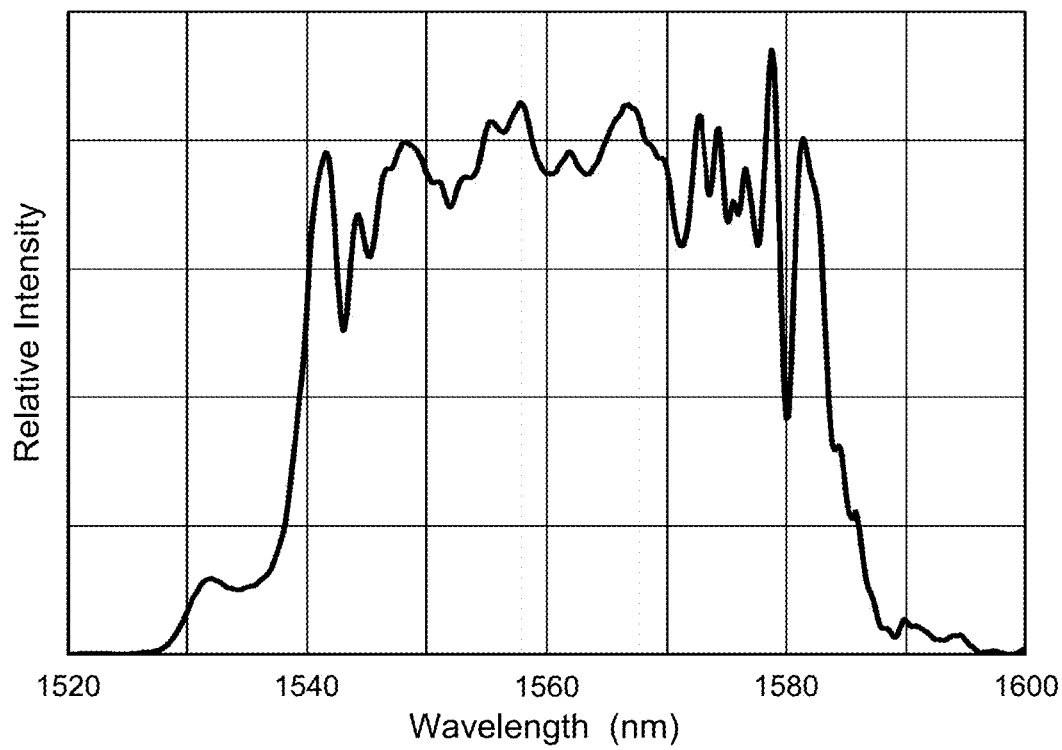
FIG. 8A is a graph schematically illustrating measured intensity vs. wavelength of the fundamental beam generated by an example of the seed laser of FIG. 1.

FIGS. 8A, 8B, 9A, and 9B are spectra generated in an experimental verification of the inventive fiber laser, using an optical gain fiber and a fiber power amplifier that are similar to those described above in reference to FIGS. 3A-7. FIG. 8A is a graph schematically illustrating measured relative intensity vs. wavelength of a fundamental beam generated in a seed laser and delivered to the first end of the optical gain fiber. The fundamental beam was first generated in a resonator that included an energized erbium-doped gain fiber, a semiconductor saturable absorber mirror (SESAM) for mode locking, and an output coupler. Pulses in the mode-locked fundamental beam were then temporally stretched in a dispersive optical fiber, preamplified in another energized erbium-doped gain fiber, and spectrally broadened by self-phase modulation. FIG. 8A depicts the spectrum of the mode-locked, stretched, preamplified, and spectrally-broadened fundamental beam delivered to the first end of the optical gain fiber.

Figure 8B:
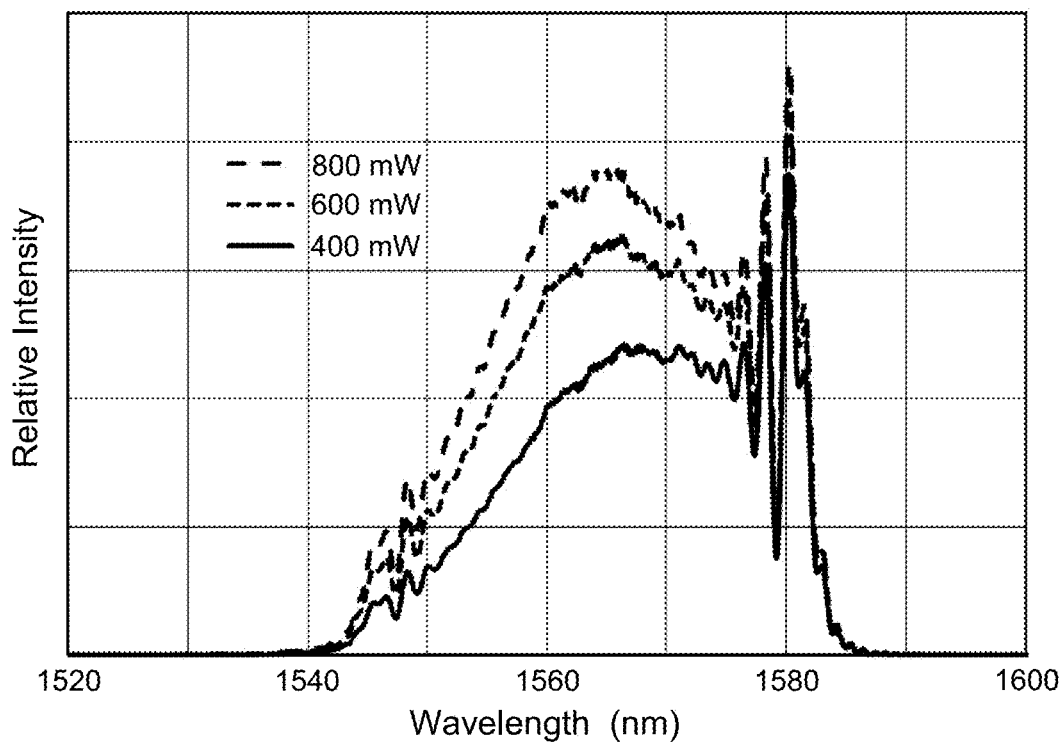
FIG. 8B is a graph schematically illustrating measured intensity for the fundamental beam of FIG. 8A after propagating through an example of the optical gain fiber of FIG. 1 vs. wavelength, for different powers of the pump beam.

FIG. 8B is a graph schematically illustrating measured relative intensity vs. wavelength of the preamplified fundamental beam at the second end of the optical gain fiber that was seeded by the fundamental beam of FIG. 8A, for different powers of the pump beam between 400 mW and 800 mW. The empirical spectra of FIGS. 8A and 8B can be compared to the theoretical spectra of respectively FIGS. 5A and 5B. These spectra experimentally verify that longer wavelengths in the seed fundamental beam are preferentially amplified and the center wavelength of the fundamental beam is thereby increased during propagation thereof from the first end to the second end of the optical gain fiber.

Figure 9A:
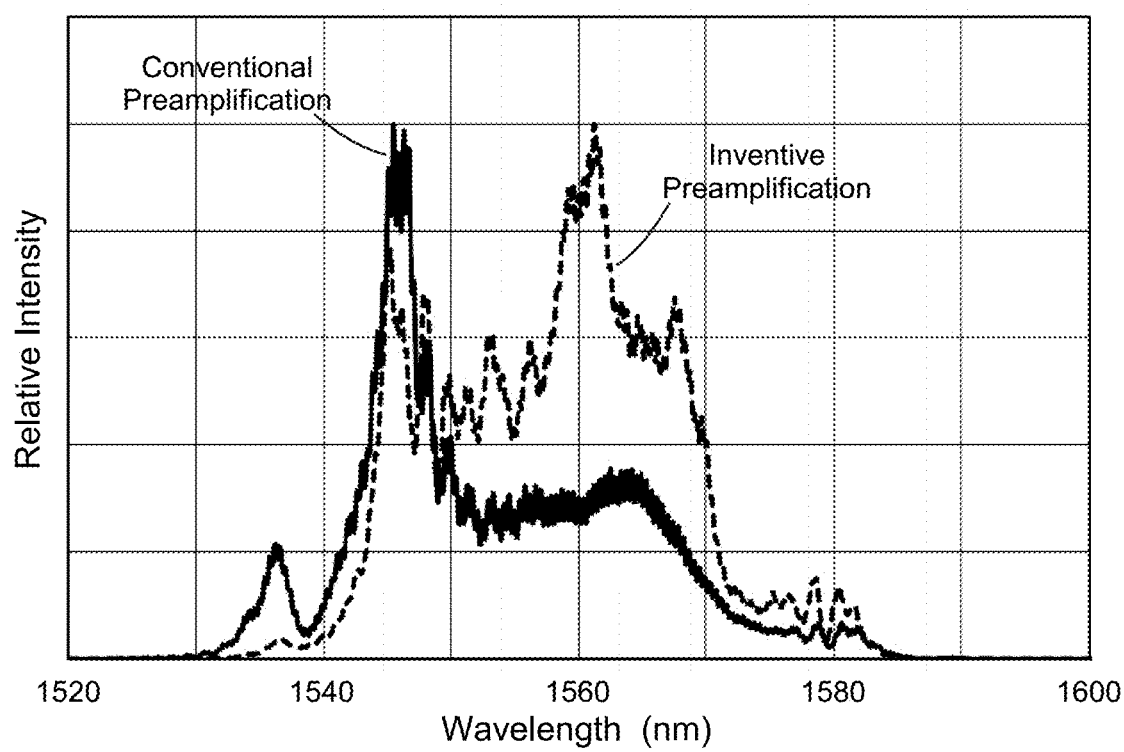
FIG. 9A is a graph schematically illustrating measured intensity of the amplified fundamental beam following pre-amplification in the optical gain fiber of FIG. 8B vs. wavelength, which is compared to an amplified fundamental beam following conventional preamplification.

FIG. 9A is a graph schematically illustrating measured relative intensity vs. wavelength for fundamental beams after amplification in the fiber power amplifier. The solid line is a spectrum of an amplified fundamental beam when the fiber power amplifier was seeded following conventional preamplification of the fundamental beam from the seed laser. The dashed line is a spectrum of an amplified fundamental beam when the fiber power amplifier was seeded by the fundamental beam of FIG. 8B that was preamplified in optical gain fiber 16 of the inventive fiber laser. The spectra have been normalized for comparison. The enhanced spectral content at higher wavelengths and suppressed spectral content at lower wavelengths in the preamplified beam of the inventive fiber laser results in a significant relative increase of the higher-wavelength spectral content in the amplified fundamental beam of the inventive fiber laser. This relative increase is even more pronounced in these empirical spectra than in the theoretical spectra of FIG. 7.

Figure 9B:
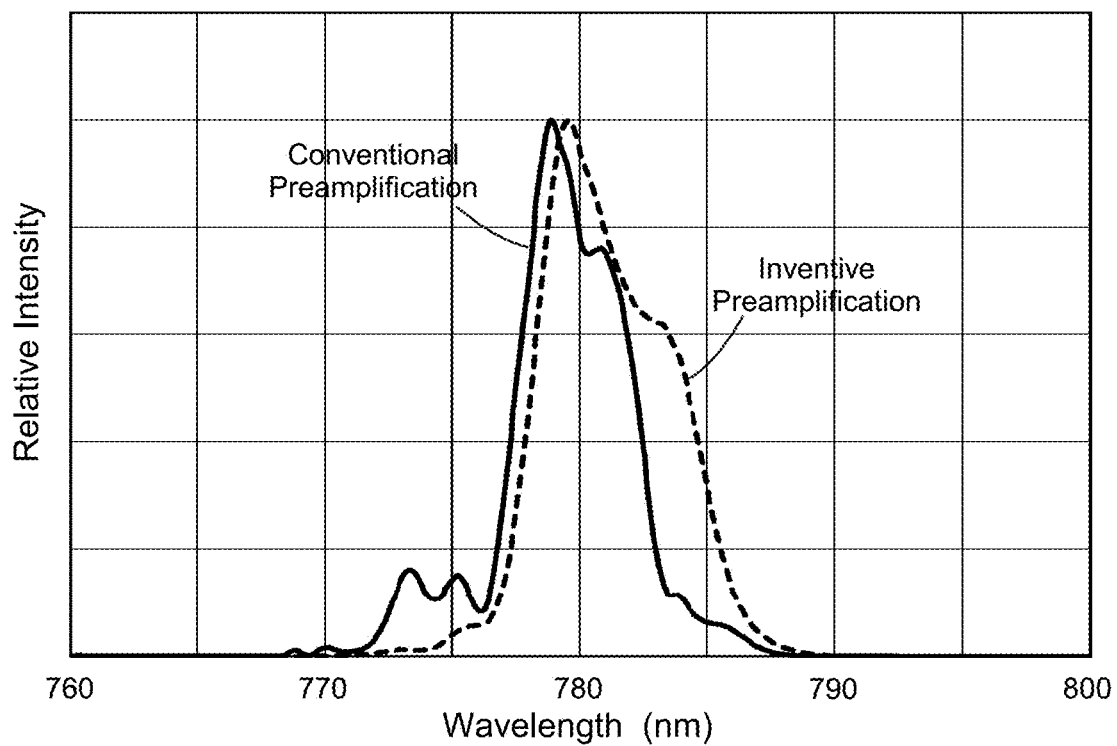
FIG. 9B is a graph schematically illustrating measured intensity of second-harmonic beams generated from the amplified fundamental beams of FIG. 9A after pulse compression.

FIG. 9B is a graph schematically illustrating measured relative intensity vs. wavelength for second-harmonic beams generated from the amplified fundamental beams of FIG. 9A. The harmonic generator was an optically-nonlinear crystal that was quasi-phased-matched for conversion of a fundamental wavelength of about 1560 nm to a second-harmonic wavelength of about 780 nm. The second-harmonic beam produced via conventional preamplification had a center wavelength of less than 780 nm. The second-harmonic beam of the inventive fiber laser had a higher average power of greater than 1 W, a broader spectral bandwidth of about 6.25 nm (full-width-at-half-maximum), and a center wavelength comfortably greater than 780 nm. The second-harmonic beam of the inventive fiber laser in FIG. 9B would correspond to a transform-limited compressed pulse having Gaussian pulse duration of about 143 fs or equivalently a $sech^2$ pulse duration of about 103 fs.

In summary, a relatively low-population-inversion erbium fiber preamplifier is used to spectrally shape a broad-spectral-bandwidth laser beam prior to amplification in a relatively high-gain erbium fiber power amplifier. This fiber laser provides an amplified laser beam having significant spectral content at higher wavelengths. The spectral bandwidth is sufficient to be compressed to a pulse duration less than or equal to 240 fs and more preferably to less than 200 fs. An output laser beam is generated from the amplified laser beam by second-harmonic generation, having a center wavelength greater than or equal to 780 nm and an average power greater than 0.5 W. A pulse compressor may be incorporated to provide an output laser beam having a pulse duration less than 200 fs. This arrangement is capable of providing an output laser beam having an average power greater than 1.0 W and a pulse duration less than 150 fs.

Such a fiber laser was built and tested. It provided an output laser beam having multi-watt average power and pulses having a duration of less than 150 fs. The spectral bandwidth and the center wavelength of the preamplified laser beam may be adjusted by changing the pump power applied to the preamplifier. An increase in pump power increases the spectral bandwidth and reduces the center wavelength.

The inventive fiber laser is comparatively simple and can be constructed using commercially available components. Variations in these components, particularly the precise composition and precise length of the optical gain fiber, may be compensated by adjusting the pump power of the preamplifier, as described above. This adjustment makes the fiber laser robust to component degradation. For example, if an optically-nonlinear crystal in the harmonic generator degrades, the power amplifier may need to be pumped harder. Any reduction in the center wavelength of the amplified laser beam due to gain shifting may be pre-compensated by reducing the pump power applied to the preamplifier, thereby increasing the center wavelength of the preamplified laser beam seeding the power amplifier.

The inventive fiber laser is more efficient than alternative designs that include spectral filtering elements within a power amplifier to flatten or shift a gain spectrum. Such spectral filtering necessarily adds optical losses and generates heat that must be removed from the power amplifier and ultimately extracted from a laser system. In contrast, the inventive fiber laser can utilize all the absorbed pump power to generate an amplified laser beam with power predominantly in the desired higher wavelengths.

It should also be noted that the inventive fiber laser can generate the desired spectral bandwidths using a linear power amplifier. Alternative designs that use self-phase modulation in a nonlinear power amplifier to overcome gain narrowing have a disadvantage that large and unwanted changes in spectral bandwidth occur when there is need to change the power of the amplified laser beam. For example, to overcome component degradation. Large changes in spectral bandwidth necessitate realignment of the pulse compressor to maintain a target pulse duration and an acceptable temporal beam shape. Another disadvantage of a nonlinear power amplifier is generation of higher-order phase, which is difficult to compensate for in a pulse compressor. The fraction of the amplified power having higher-order phase is not compressed into a desired time-bandwidth limited pulse, effectively increasing the overall compressed pulse duration or equivalently reducing the fraction of the amplified power within the time-bandwidth limited pulse.

The present invention is described above in terms of a preferred embodiment and other embodiments. The invention is not limited, however, to the embodiments described and depicted herein. Rather, the invention is limited only by the claims appended hereto.

What is claimed is:

1. A fiber laser, comprising:
   a seed laser generating a pulsed fundamental beam having a center wavelength;
   an optical gain fiber arranged to receive the fundamental beam, the fundamental beam propagating through the optical gain fiber from a first end to a second end thereof, the optical gain fiber having a core doped with erbium ions that are energized by a pump beam, the fundamental beam and the pump beam counter-propagating within the optical gain fiber, the pump beam having a power selected to produce population inversion at the second end of the optical gain fiber in a range between 30% and 60% and everywhere in the optical gain fiber of less than 60%, the optical gain fiber having a length selected such that the optical gain fiber absorbs all the power of the pump beam during counter propagation of the pump beam with respect to the fundamental beam, the center wavelength of the fundamental beam increasing between the first end and the second end of the optical gain fiber due to amplification of longer wavelengths within the fundamental beam and absorption of shorter wavelengths within the fundamental beam, the center wavelength increasing to between 1570 nanometers and 1575 nanometers;

an erbium fiber power amplifier arranged to receive the fundamental beam from the optical gain fiber and to linearly amplify the fundamental beam to generate an amplified fundamental beam, the amplified fundamental beam having a spectral bandwidth that is compressible to a pulse duration less than or equal to 240 femtoseconds; and a harmonic generator arranged to receive the amplified fundamental beam and to generate a second-harmonic beam having a center wavelength greater than or equal to 780 nanometers.

2. The fiber laser of claim 1, wherein the erbium fiber power amplifier comprises more than one erbium fiber amplifier.

3. The fiber laser of claim 1, wherein the population inversion at the second end of the optical gain fiber is in a range between 40% and 60%.

4. The fiber laser of claim 1, wherein the amplified fundamental beam has a spectral bandwidth that is compressible to a pulse duration less than 200 femtoseconds.

5. The fiber laser of claim 1, further comprising a pulse compressor for temporally compressing the amplified fundamental beam.

6. The fiber laser of claim 5, wherein the second-harmonic beam has a pulse duration less than 200 femtoseconds.

7. The fiber laser of claim 6, wherein the second-harmonic beam has a pulse duration less than 150 femtoseconds.

8. The fiber laser of claim 1, wherein the fundamental beam generated by the seed laser has a uniform intensity from 1547 nanometers to 1583 nanometers.

9. The fiber laser of claim 1, wherein intensities of wavelengths in the fundamental beam greater than 1570 nanometers are enhanced relative to intensities of wavelengths less than 1562 nanometers during propagation thereof through the optical gain fiber.

10. The fiber laser of claim 1, wherein a power of the pump beam is selectable, to achieve a selected spectral bandwidth of the fundamental beam at the second end of the optical gain fiber.

11. The fiber laser of claim 1, wherein a power of the pump beam is selectable, to achieve a selected center wavelength of the fundamental beam at the second end of the optical gain fiber.

12. The fiber laser of claim 1, wherein the amplified fundamental beam has a center wavelength greater than 1560 nanometers.

13. The fiber laser of claim 1, wherein the second-harmonic beam has an average power greater than 0.5 watt.

14. The fiber laser of claim 13, wherein the second-harmonic beam has an average power greater than 1 watt.

15. A method for generating an output laser beam, comprising the steps of:

generating a pulsed fundamental beam having a center wavelength;

delivering the fundamental beam to an optical gain fiber having a core doped with erbium ions, the fundamental beam propagating through the optical gain fiber from a first end to a second end thereof;

energizing the erbium ions using a pump beam, the fundamental beam and the pump beam counter-propagating within the optical gain fiber, the pump beam having a power selected to produce population inversion at the second end of the optical gain fiber in a range between 30% and 60% and everywhere in the optical gain fiber of less than 60%, the optical gain fiber having a length selected to absorb such that the optical gain fiber absorbs all the power of the pump beam during counter propagation of the pump beam with respect to the fundamental beam, the center wavelength of the fundamental beam increasing between the first end and the second end of the optical gain fiber due to amplification of longer wavelengths within the fundamental beam and absorption of shorter wavelengths within the fundamental beam, the center wavelength increasing to between 1570 nanometers and 1575 nanometers;

linearly amplifying the fundamental beam from the optical gain fiber in an erbium fiber power amplifier to generate an amplified fundamental beam, the amplified fundamental beam having a spectral bandwidth that is compressible to a pulse duration less than or equal to 240 femtoseconds; and converting the amplified fundamental beam to the output laser beam by second-harmonic generation, the output laser beam having a center wavelength greater than or equal to 780 nanometers.

16. The method of claim 15, wherein the population inversion at the second end of the optical gain fiber is in a range between 40% and 60%.

17. The method of claim 15, wherein the amplified fundamental beam has a spectral bandwidth that is compressible to a pulse duration less than 200 femtoseconds.

18. The method of claim 15, further including a step of temporally compressing the amplified fundamental beam.

19. The method of claim 18, wherein the second-harmonic beam has a pulse duration less than 200 femtoseconds.

20. The method of claim 19, wherein the second-harmonic beam has a pulse duration less than 150 femtoseconds.

21. The method of claim 15, wherein intensities of wavelengths in the fundamental beam greater than 1570 nanometers are enhanced relative to intensities of wavelengths less than 1562 nanometers during propagation thereof through the optical gain fiber.

22. The method of claim 15, further comprising the step of selecting a power of the pump beam to achieve a selected spectral bandwidth of the fundamental beam at the second end of the optical gain fiber.

23. The method of claim 15, further comprising the step of selecting a power of the pump beam to achieve a selected center wavelength of the fundamental beam at the second end of the optical gain fiber.

24. The method of claim 15, wherein the output laser beam has an average power greater than 0.5 watt.

25. The method of claim 24, wherein the output laser beam has an average power greater than 1.0 watt.

* * * * *